Figure 5:
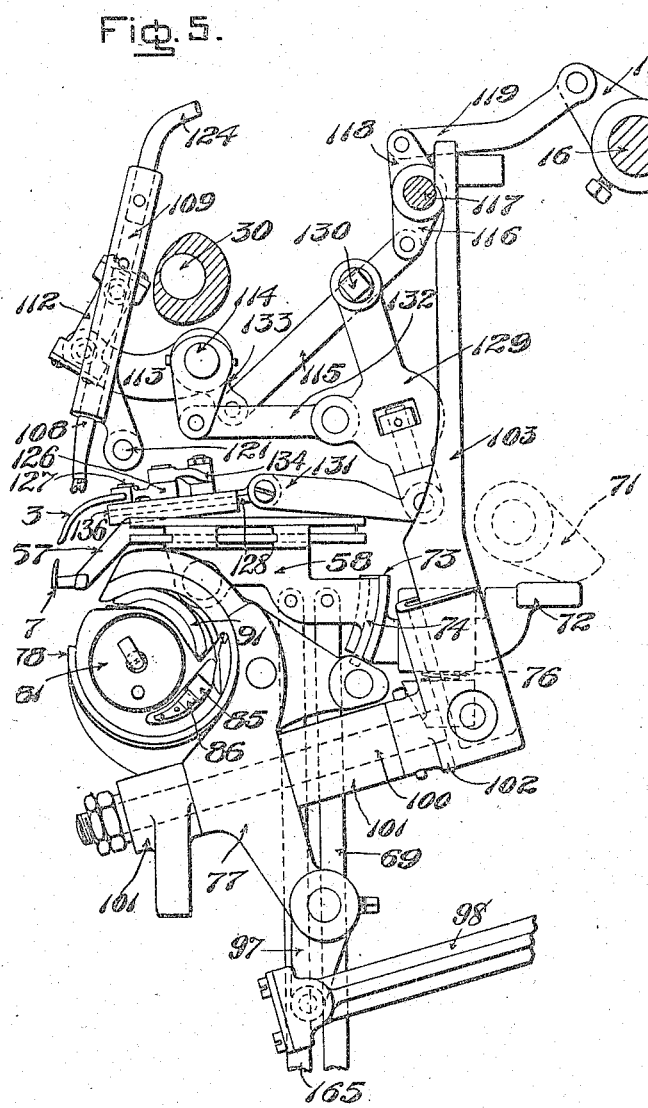

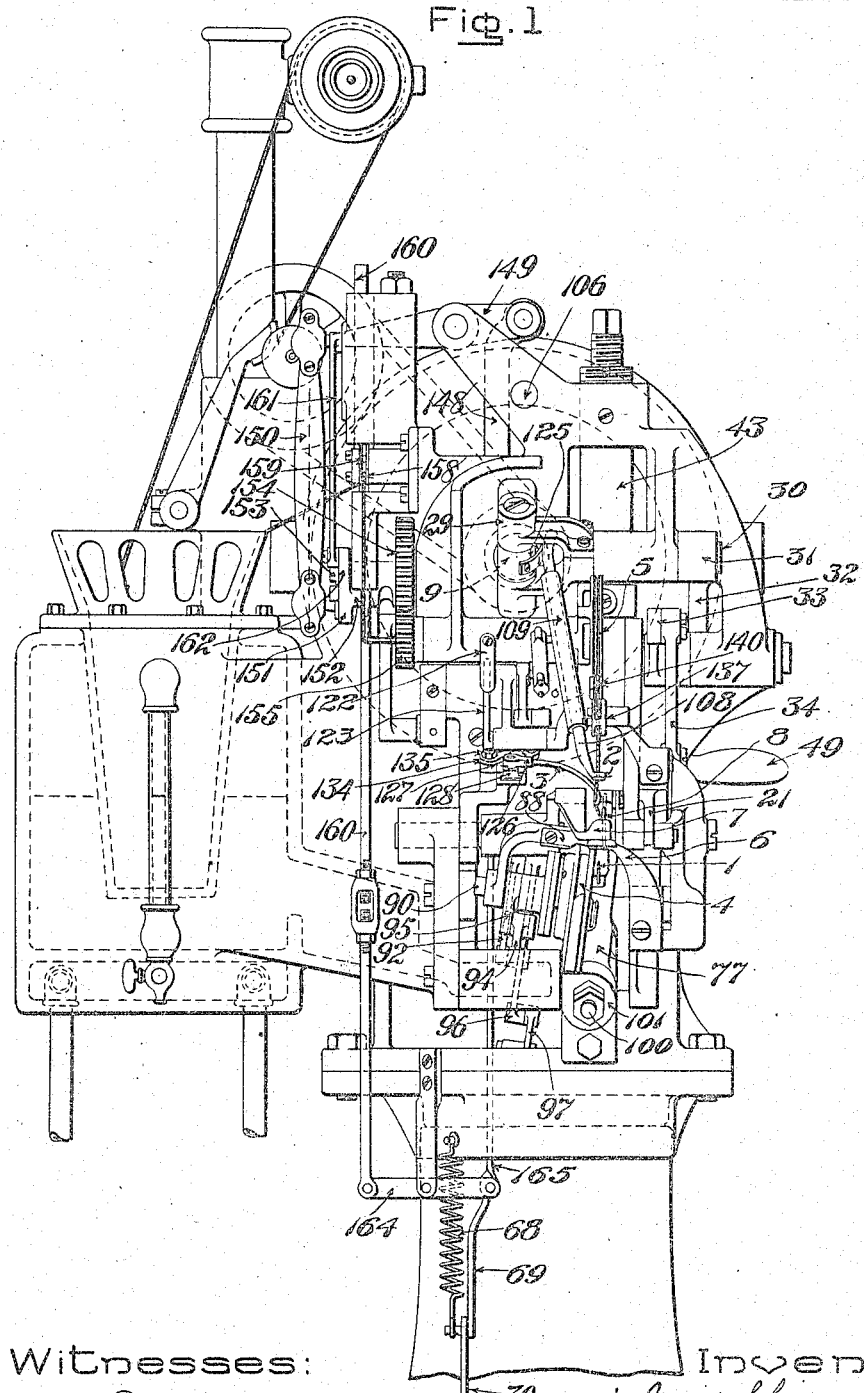

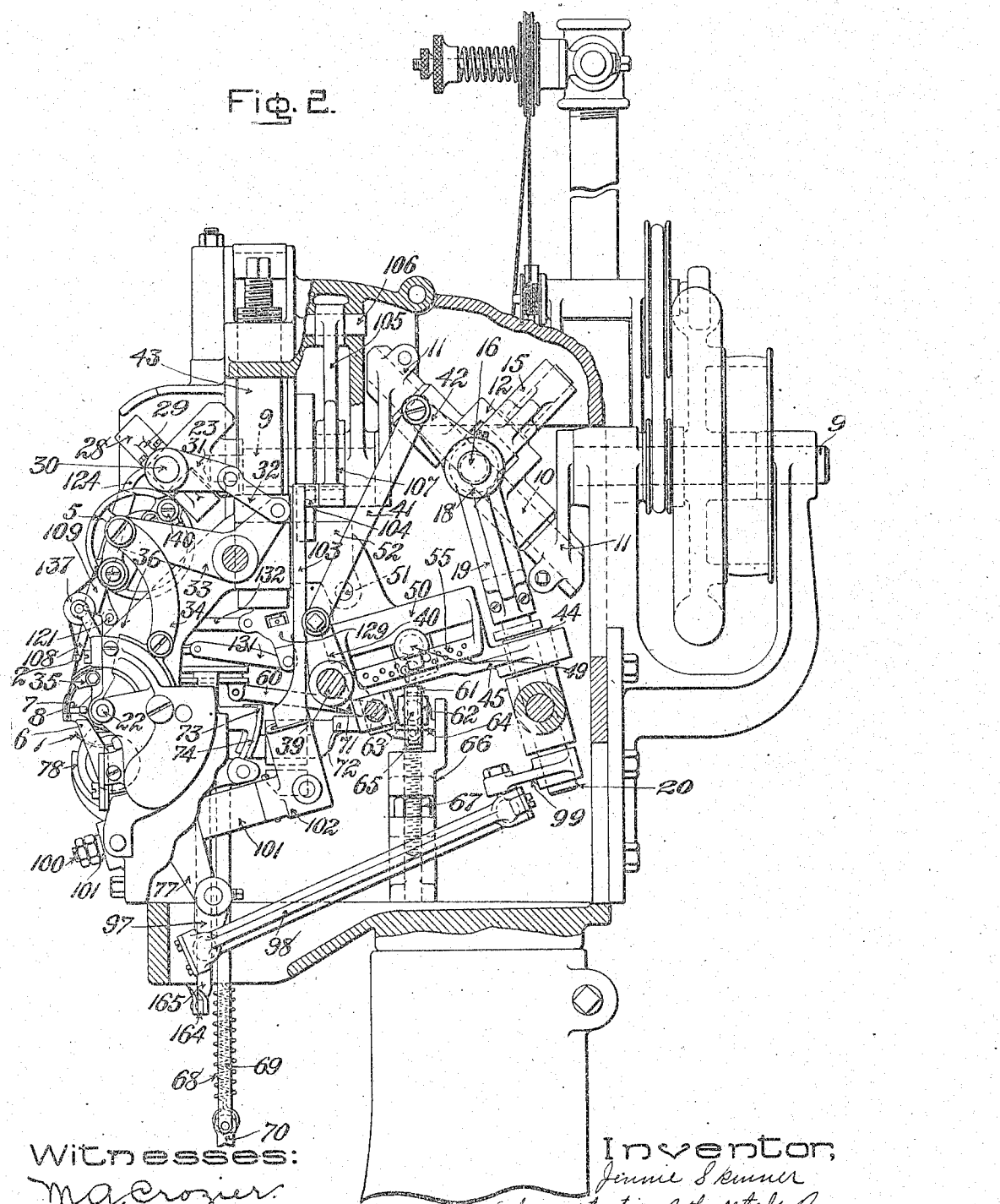

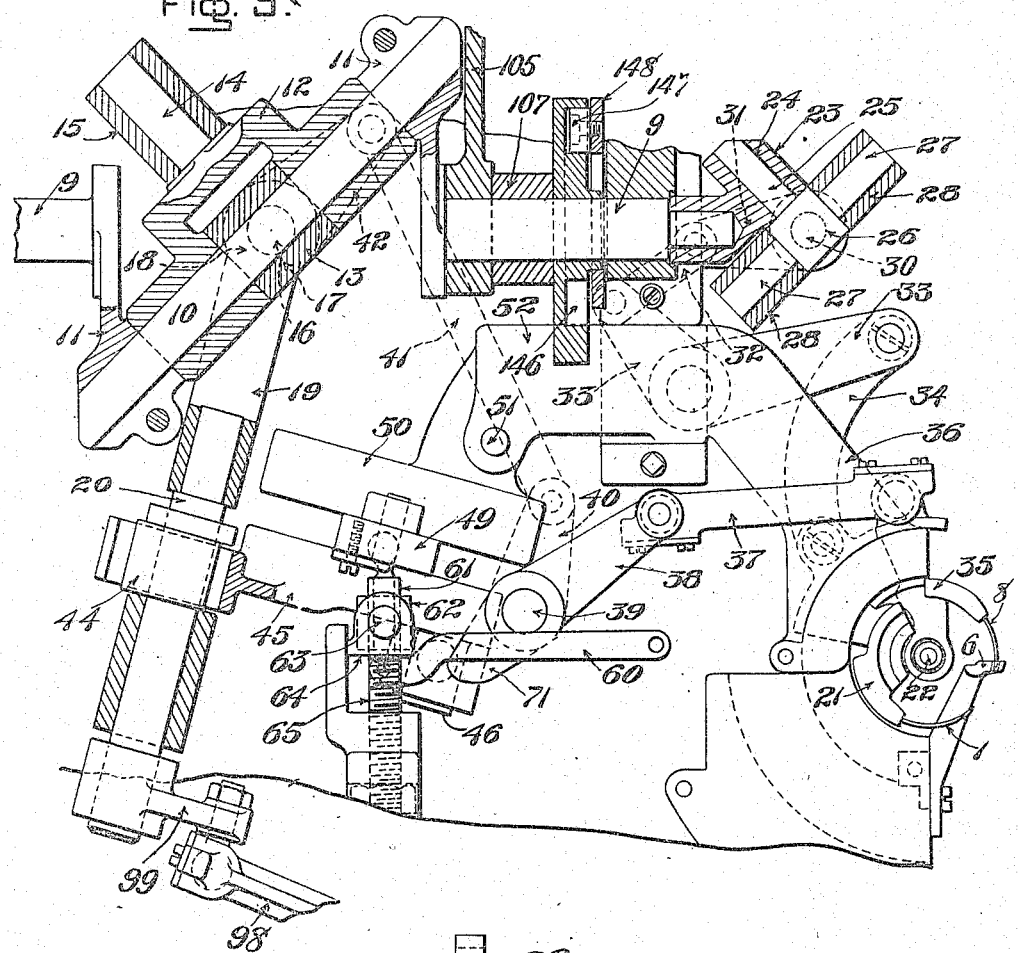
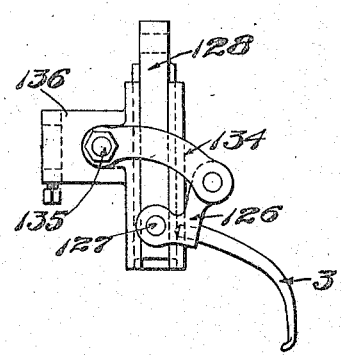

C. F. SKINNER, DEC'D.
J. SKINNER, ADMINISTRATRIX.
SEWING MACHINE.
APPLICATION FILED JUNE 16, 1911.

1,129,365.

Patented Feb. 23, 1915.
8 SHEETS—SHEET 4.

Witnesses:
M. G. Crozier
H. D. McPhail

Inventor.
Jennie Skinner
Administratrix of the estate of
Clarence F Skinner, deceased
by Phillips Van Everen & Fish Att'ys.

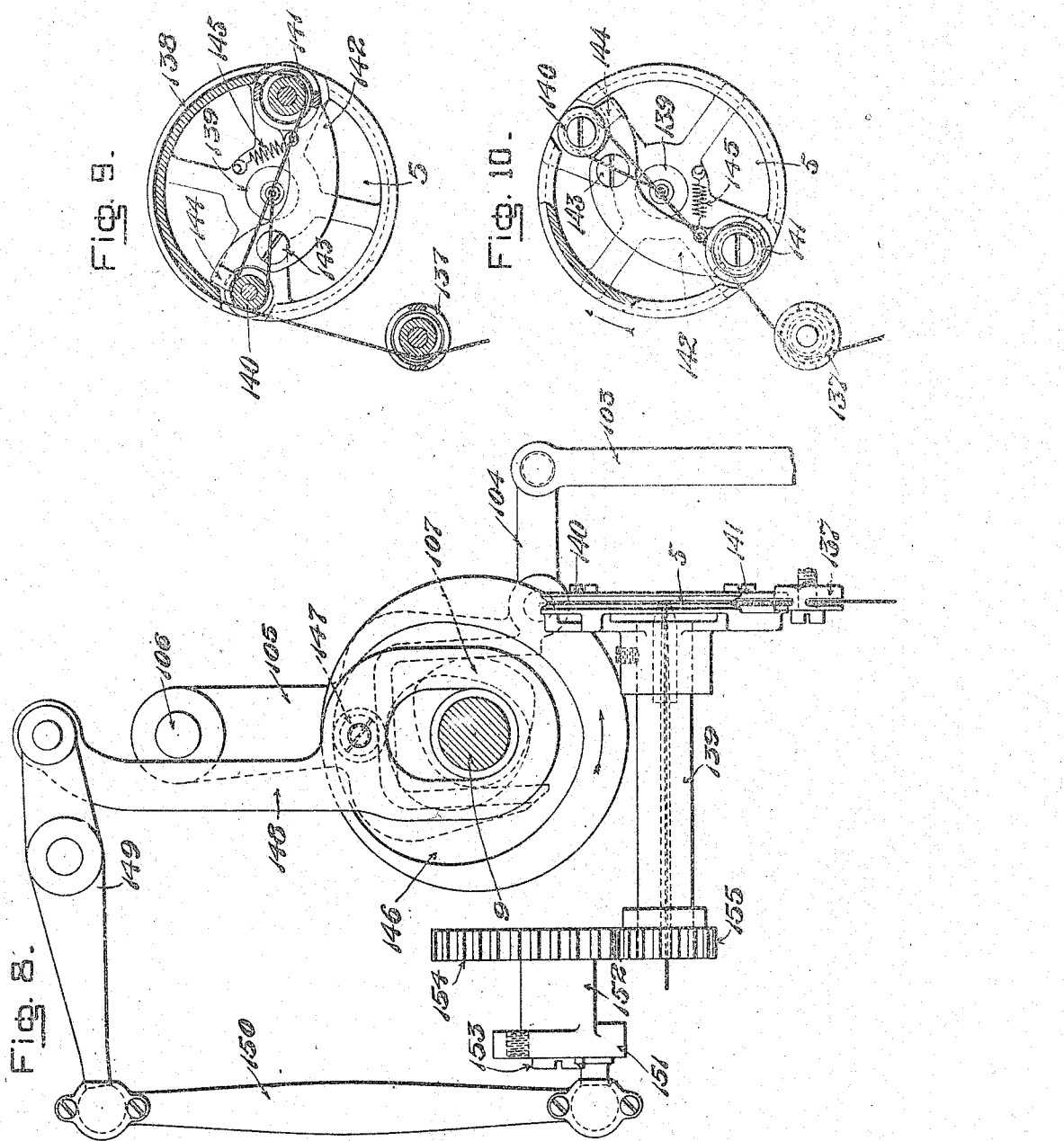

C. F. SKINNER, DEC'D.
J. SKINNER, ADMINISTRATRIX.
SEWING MACHINE.
APPLICATION FILED JUNE 16, 1911.
1,129,365.
Patented Feb. 23, 1915.
8 SHEETS—SHEET 6.
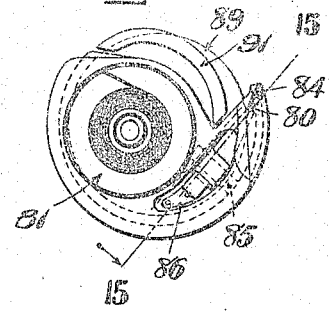
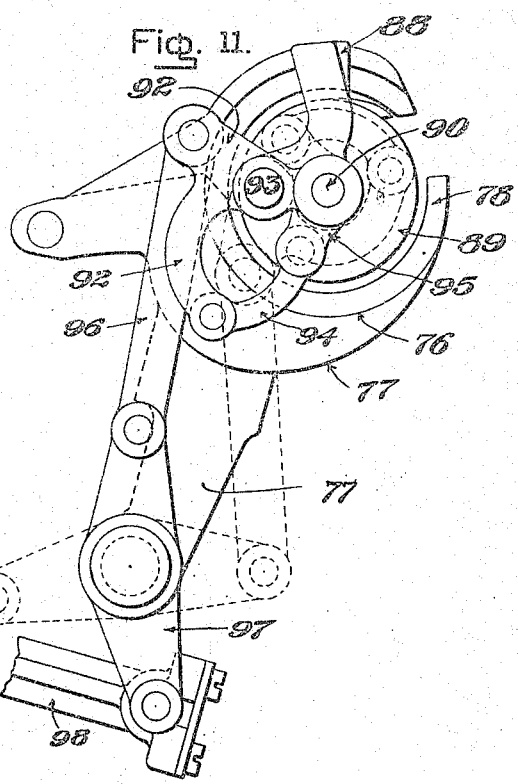
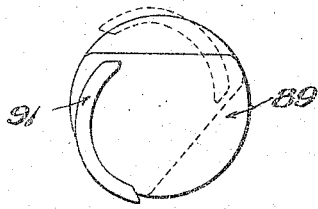
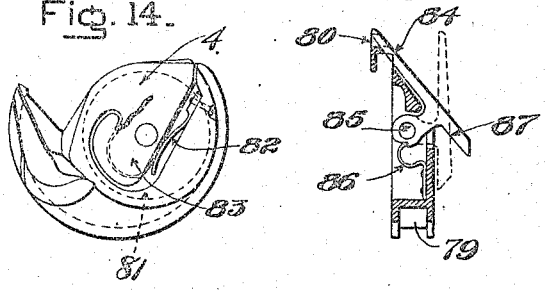
Witnesses:
M. G. Crozier
N. D. McPhail
Inventor,
Jennie Skinner
Administratrix of the estate of
Clarence F. Skinner, deceased
by Phillips Van Everen & Fish Attys C. F. SKINNER, DEC'D.
J. SKINNER, ADMINISTRATRIX.
SEWING MACHINE.
APPLICATION FILED JUNE 16, 1911.
1,129,365.
Patented Feb. 23, 1915.
8 SHEETS—SHEET 7.
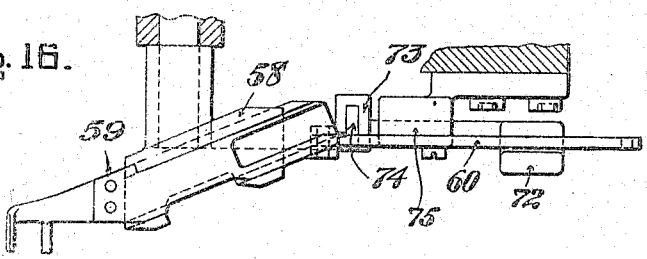
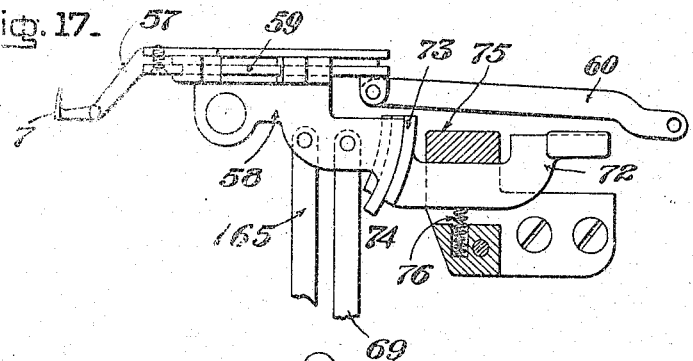
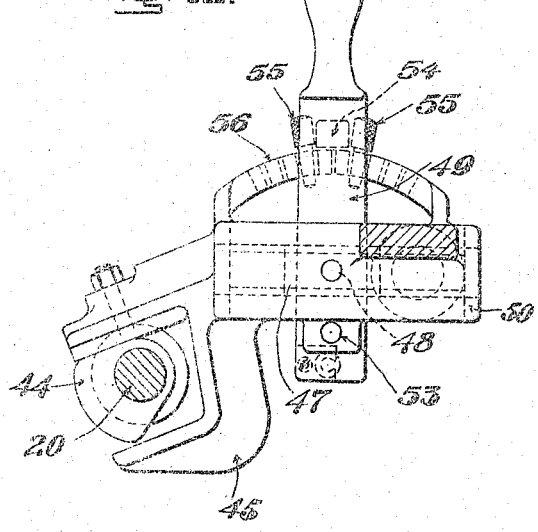
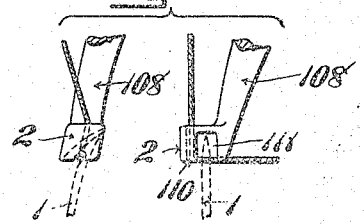
Witnesses:
M. J. Crozier
H. D. McPhail
Inventor,
Jennie J. Skinner
Administratrix of the Estate of
Clarence F. Skinner, deceased
by Phillips Van Everen & Fish Att'ys.

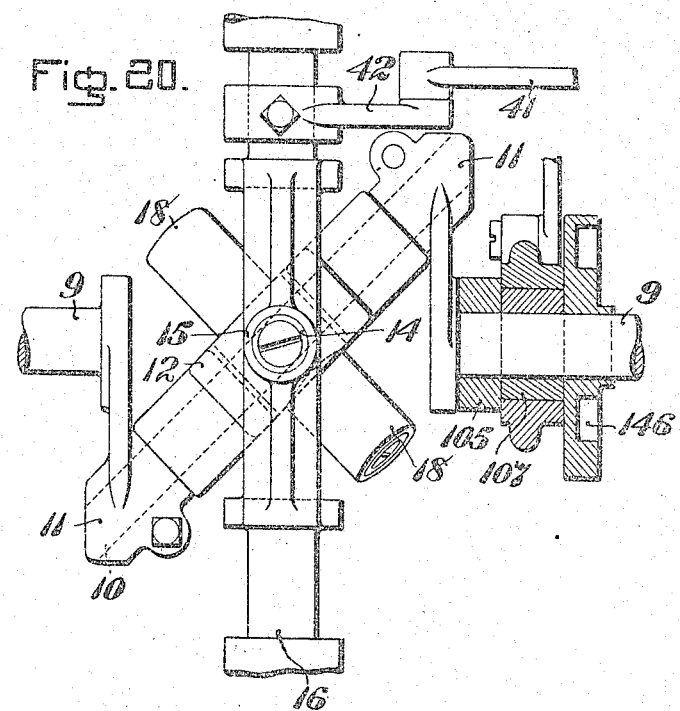
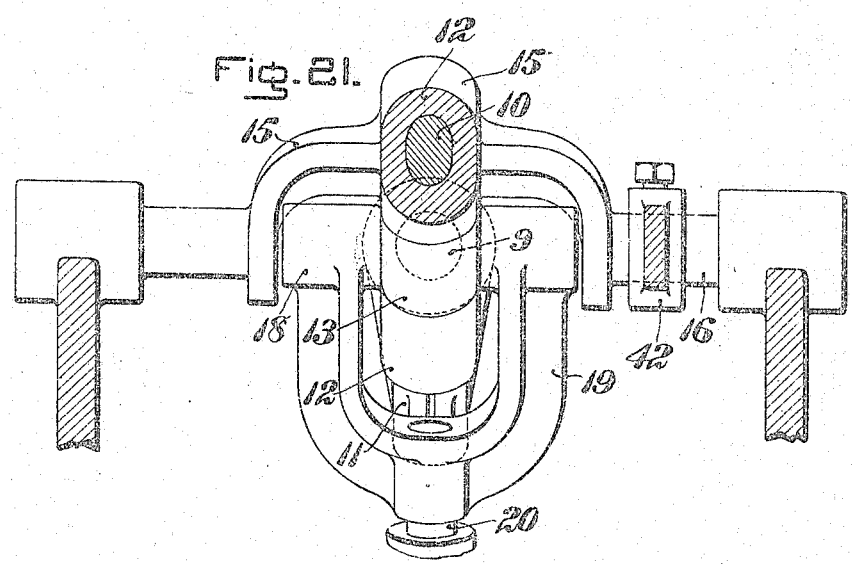

UNITED STATES PATENT OFFICE.

CLARENCE F. SKINNER, DECEASED, LATE OF BEVERLY, MASSACHUSETTS, BY JENNIE SKINNER, ADMINISTRATRIX, OF NEWARK, NEW JERSEY, ASSIGNOR TO UNITED SHOE MACHINERY COMPANY, OF BOSTON, MASSACHUSETTS, AND PATERSON, NEW JERSEY, A CORPORATION OF NEW JERSEY.

SEWING-MACHINE.

1,129,365.      Specification of Letters Patent.      Patented Feb. 23, 1915.

Application filed June 16, 1911. Serial No. 633,542.

*To all whom it may concern:*

Be it known that CLARENCE F. SKINNER, deceased, late of Beverly, in the county of Essex and State of Massachusetts, invented certain Improvements in Sewing-Machines, of which the following description, in connection with the accompanying drawings, is a specification, like reference characters on the drawings indicating like parts in the several figures.

The invention relates to sewing machines, and more particularly to wax thread, lock stitch, curved hook needle machines such as are commonly employed for securing the outsoles to boots and shoes.

The object of the invention is to improve and simplify the construction and arrangement of the various thread handling instrumentalities of a machine of this type whereby the mode of operation of the machine is improved, and the various operations incident to the formation of the seam may be performed in a more rapid and reliable manner.

To these ends the invention contemplates the provision of an improved construction and arrangement of shuttle whereby the shuttle is adapted to take the loop directly from a curved hook needle in a uniformly reliable manner, and whereby a proper spread of the loop to pass over the shuttle is insured without undue strain upon the thread.

The invention also contemplates the provision of other improved and novel features and combinations which will be hereinafter described and referred to in the claims, the advantages of which will be apparent to those skilled in the art.

The various features of the invention will be understood from the accompanying drawings and the following detailed description of the machine illustrated therein.

Figure 6:
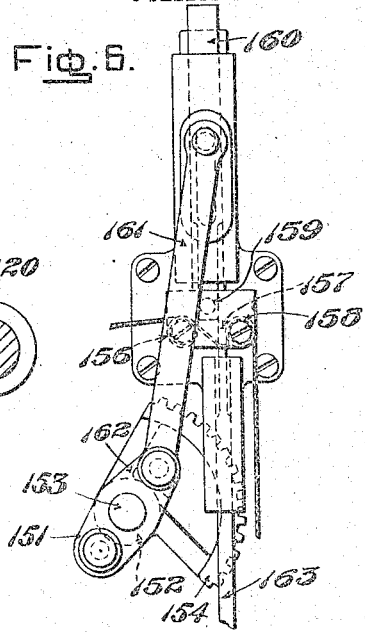
Figure 7:
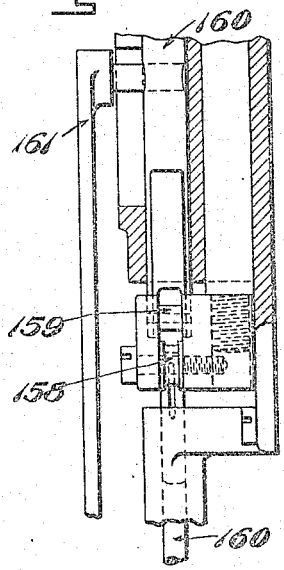

In the drawings Figure 1 is a front elevation of a machine embodying the various features of the invention in their preferred forms; Fig. 2 is a side elevation partly in section, the inclosing casing of the machine frame being broken away; Fig. 3 is a detail sectional elevation showing the mechanism for operating the awl and needle segments; Fig. 4 is a detail plan view of the thread arm; Fig. 5 is a detail elevation partly in section showing the shuttle carrier and various other parts of the thread handling devices; Fig. 6 is a detailed elevation of the pull-off; Fig. 7 is a side elevation, partly in section, of the devices shown in Fig. 6; Figs. 8, 9 and 10 are detailed views of the takeup and its actuating mechanism; Fig. 11 is a detailed elevation of the shuttle carrier and shuttle driving mechanism; Fig. 12 is a side elevation of the shuttle and shuttle driver; Fig. 13 is a detail of the shuttle driver; Fig. 14 is a side view of the shuttle showing the side opposite to that shown in Fig. 12; Fig. 15 is a sectional view on line 15—15, Fig. 12; Fig. 16 is a detail plan view of the presser foot; Fig. 17 is a side elevation partly in section of the devices shown in Fig. 16; Fig. 18 is a detail plan view of a part of the feed mechanism; Fig. 19 is a detail showing a side and front elevation of the lower end of the looper; Fig. 20 is a detail plan view of a portion of the mechanism illustrated in Fig. 3 with the driving shaft turned through an angle of ninety degrees, and Fig. 21 is a detail sectional view of the mechanism illustrated in Fig. 20 looking toward the left and with the drive shaft in the position in which it is shown in Fig. 3.

The machine shown in the drawings is provided with a curved hook needle 1, a forked looper 2 for laying the needle thread in the hook of the needle, a thread arm 3 for drawing off thread to form one side of the loop drawn by the needle, a shuttle 4 for passing the locking thread through the loop drawn by the needle, and a takeup 5 for taking up the loop through which the shuttle passes to set the stitch. The machine is also provided with a work support 6 and presser foot 7 for supporting and holding the work, and with a curved awl or feed point 8 for feeding the work. The parts are so arranged that the work support engages the bottom of the sole of the shoe, and the presser foot is utilized as a gage against which the upper is held and guided during the sewing operation. The general mode of operation of the parts referred to is substantially the same as the mode of operation of corresponding parts in the usual construction of wax thread, lock stitch sewing machines employing curved hook needles.

The various parts of the machine are driven from a main driving shaft 9, and for the most part the motions for the different instrumentalities are derived from diagonal cranks carried by the driving shaft. By the employment of these diagonal cranks the use of cams is to a great extent avoided, and the parts may be driven at a high rate of speed with a minimum amount of wear, and without danger of imparting vibrations to the machine. As shown in Figs. 2, 3 and 20, the shaft 9 is formed in two sections which are connected by a diagonal shaft 10 which is arranged at an angle of 45° to the front and rear sections of the shaft 9, and forms a diagonal crank connecting the shaft sections. The ends of the diagonal shaft 10 are secured in arms 11 which are in turn secured to the sections of the shaft 9. Two sleeves 12 and 13 are loosely mounted upon the shaft 10, the sleeve 12 being recessed at its center portion to receive the sleeve 13. The sleeve 12 is provided with a trunnion 14 arranged at right angles to the shaft 10, and with its axis intersecting the axes of the shafts 9 and 10. The trunnion is engaged by a bearing 15 formed on a yoke the arms of which are secured to the inner ends of the two sections of a horizontal shaft 16 journaled in the frame of the machine. The sections of the shaft 16 are mounted on opposite sides of the diagonal shaft 10 with their axes intersecting the axes of the shafts 9 and 10 as shown in Figs. 2, 3, 20 and 21. The sleeve 13 is provided with trunnions 17 on opposite sides of the shaft 10, the axes of which intersect the axes of the shafts 9 and 10. These trunnions are engaged by bearings 18 on the arms of a yoke 19 which is secured to the upper end of a vertically inclined shaft 20. By these connections between the inclined crank shaft 10 and the shafts 16 and 20, the shafts 16 and 20 are oscillated back and forth during each revolution of the main driving shaft 9. Through connections which will be hereinafter described, oscillatory movements are imparted to the shuttle, and oscillatory feeding movements are imparted to the feeding awl from the shaft 20. The shaft 16 operates through connections which will be hereinafter described to oscillate the awl segment to engage and disengage the work to raise and lower the presser foot, and to reciprocate the looper 2 which lays the thread in the hook of the needle.

The needle 1 is carried in a needle segment 21 which may be of any suitable construction, and mounted to oscillate about a fixed axis 22 (Fig. 3). The needle segment is oscillated during each revolution of the main driving shaft through an inclined or diagonal crank carried by the front end of the shaft 9. This crank comprises a collar 23 secured to the end of the shaft 9, and provided with a diagonal bearing 24. The bearing is engaged by a trunnion 25 projecting from a block 26 which is also provided with two trunnions 27 mounted in line with each other and at right angles to the trunnion 25, the axes of the trunnions 25 and 27 being in the same plane. The trunnions 27 are engaged by bearings 28 formed on the ends of a yoke 29 which is secured to one end of a horizontal rock shaft 30 (Figs. 1, 2 and 3). An arm 31 is secured to the other end of the rock shaft, and is connected by a link 32 with one arm of a bell crank lever 33, the other arm of which is connected by a link 34 with the needle segment.

The awl 8 is carried in an awl segment 35 which may be of any suitable construction, and is mounted to oscillate in a carrier arm 36, the axis about which the awl segment oscillates being substantially coincident with the axis about which the needle segment oscillates. Oscillatory movements are imparted to the awl sections from the horizontal rock shaft 16 through a link 37, the front end of which is pivotally connected to the awl segment, and the rear end of which is pivotally connected to an arm 38 secured on a rock shaft 39. An arm 40 is secured to one end of the rock shaft 39, and is connected by a link 41 with an arm 42 secured to the right-hand end of the shaft 16 Figs. 2, 3, 20 and 21. The arm 38 and link 37 are so arranged that when the shaft 39 is rocked to force the awl into the work, they pass slightly beyond the dead center, thus withdrawing the awl slightly to relieve the friction between the work and work support 6.

The arm 36 which carries the awl segment is secured upon a vertical rock shaft 43. The rock shaft is rocked to effect the feed of the work from a cam 44 secured to the rock shaft 20 through connections which may be adjusted to vary the length of stitch. As shown, these connections comprise a lever 45 which is pivotally supported at 46 and is provided at its free end with a yoke, the arms of which engage opposite sides of the cam 44 (Figs. 2, 3 and 18). The lever 45 is provided on its upper side with a longitudinal guideway in which is mounted a sliding pivot block 47 (Fig. 18). This pivot block is connected by means of a pivot pin 48 with an adjusting lever 49 carried by an arm 50 which is connected by a pivot 51 with an arm 52 secured to the rock shaft 43. The lever 49 is pivoted at 53 to the arm 50, so that it may be adjusted to vary the pivotal connection between the lever 45 and arm 50, and thus vary the movements imparted to the rock shaft 43, and consequently vary the feed of the work by the awl. The lever 49 may be held in adjusted position by means of a lug 54 projecting downward from the lever and arranged to be engaged by stop pins 55. The arm 50 is provided with a segmental bar 56 provided with a series of holes for locating the pins 55 in accordance with the length of stitch desired.

The presser foot 7 is formed on the forward end of an arm 57 which is adjustably mounted on a carrier lever 58 so that the presser foot may be moved forward or back to vary the distance of the seam from the upper of the shoe being sewed. The arm 57 is secured to a bar 59 guided in ways formed in the lever 58 (Figs. 16 and 17). In order that the position of the seam with relation to the upper may be varied in varying the length of stitch, as, for instance, when passing from the forepart to the shank, the bar 59 is connected with the adjusting lever 49 so that it may be adjusted by the movement of the lever in varying the length of stitch. The connections shown comprise a link 60 one end of which is pivotally connected with the bar 59, and the other end of which is connected to the lower end of a lever 61 (Figs. 2 and 3). The upper end of the lever 61 is connected to the end of the lever 49 by a ball and socket joint, and the lever is mounted in a guideway formed in the end of a pivot block 62. The pivot block is provided with a cylindrical shank 63 which extends through a bearing formed in a vertically adjustable block 64. The block 64 is secured upon the upper end of a screw threaded rod 65 which passes through bearings in a support 66 and is threaded through a nut 67. By vertical adjustment of the rod 65, the pivot of the pivot block 63 may be moved up and down the lever 61 to vary the movement imparted to the presser foot from the lever 49. If it is desired to hold the presser foot in fixed position so that it will not be affected by adjustments in the length of the stitch, the axis of the pivot may be adjusted so that it is in line with the pivotal connection between the link 60 and the lever 61. In this case the lever 61 will swing about its pivot when the lever 49 is moved to vary the length of stitch without imparting any movement to the link 60 and the presser foot connected therewith.

The lever 58 which carries the presser foot is forced in a direction to press the presser foot against the work by a spring 68, one end of which is connected to a fixed part of the frame, and the other end of which is connected to the lower end of a rod 69. The upper end of the rod 69 is pivotally connected to the lever 58, as indicated in Fig. 17. The presser foot may be raised in inserting the work by means of a treadle (not shown) connected through a link 70 with the lower end of the rod 69. The presser foot is raised during the feeding movement of the awl and is released so that it will engage the work when the awl is disengaged from the work, by means of a cam 71 carried by the rock shaft 39 through which the awl segment is oscillated. The cam 71 is arranged to engage the rear end of an arm 72, the front end of which is grooved to form segmental ribs 73 embracing a segmental rib 74 formed on the rear end of the lever 58 (Figs. 16 and 17). The arm 72 is normally forced up against the under side of a plate 75 by a spring 76. When the shaft 39 is rocked to force the awl into the work preparatory to the feed, the cam 71 engages the rear end of the arm 72 and forces the arm downward against the tension of the spring 76. This pressure applied to the rear end of the arm 72 cants the arm, so that the ribs 73 grip the rib 74 on the lever 58, and the lever is rocked to raise the presser foot from the work. When the rock shaft 39 is rocked to retract the awl, the cam 71 disengages the arm 72 and the arm is returned by the spring 76 into position against the plate 75. When in this position the ribs 73 are held in a position concentric with the axis of the lever 58, so that the rib 74 may slide freely between them. The presser foot is therefore free to be forced against the work by the spring 68, and adjust itself to any variation in the thickness of the work.

The shuttle 4 is of discoidal form, and is mounted to oscillate in a raceway 76 formed in a carrier 77 (Figs. 1, 5, and 11 to 15). The shuttle is held and guided in the raceway by an annular rib 78 on the shuttle carrier arranged to engage a peripheral groove 79 formed in the shuttle. The shuttle is provided with a pointed nose 80 which is offset to one side of the plane of the shuttle, and is adapted to enter the loop of thread drawn by the hooked needle and take the loop directly from the needle. The shuttle contains the usual bobbin holder 81 for the shuttle or locking thread, and is provided with a tension spring 82 and plate 83 under which the thread is passed on its way to the work, and by which the proper tension is applied to the shuttle thread. The shuttle is also provided with a device for spreading the loop of needle thread as the nose of the shuttle enters the loop, so that the loop is cast off from the needle and passed about the shuttle in a uniformly reliable manner, and without straining the thread. In the form shown this spreading device consists of a spreader finger 84 arranged in the nose of the shuttle. The finger is pivotally supported upon the shuttle at 85, and is held in normal position by a spring 86. The spreader finger is provided with a tail or extension 87 which projects beyond the side of the shuttle, and is adapted to engage a fixed cam 88 as the nose of the shuttle enters the needle loop. As the tail of the spreader finger is carried along the fixed cam 88, the finger is swung about its pivot to gradually spread the needle loop and direct the same about the nose of the shuttle.

The shuttle is oscillated in the raceway of the shuttle carrier by means of a shuttle driver comprising a disk 89 carried on the end of a shaft 90 and provided with a shuttle engaging rib 91. The rib 91 is arranged to loosely engage the shuttle, as indicated in Fig. 12, and to impart oscillatory movements to the shuttle as the driving disk 89 is oscillated between the positions indicated in dotted and full lines in Fig. 13. The shuttle driving disk is oscillated through a lever 92 mounted upon a fixed pivot 93 in the shuttle carrier, and connected by a link 94 with an arm 95 secured to the shaft 90. The lever 92 is connected by a link 96 with a second lever 97 pivotally mounted on the shuttle carrier and connected by a link 98 with an arm 99 which is secured to the lower end of the rock shaft 20.

In order that the shuttle may take the needle loop directly from the needle without interfering with the advance and return stroke of the needle in drawing a new loop of needle thread, the shuttle carrier is mounted to oscillate about an axis substantially at right angles to the axis of the shuttle to bring the nose of the shuttle into and out of the plane of the needle. As shown, the shuttle carrier 77 is secured upon a rock shaft 100 which is mounted in fixed bearings 101 (Figs. 1, 2 and 5). A collar 102 is secured to the rear end of the rock shaft 100, and an arm 103 is pivotally secured in a slot formed in the rear end of the collar. The upper end of the arm 103 is connected by a link 104 with a yoke 105 which is pivoted at 106, and is provided at its lower end with arms embracing a cam 107 secured to the shaft 9 (Figs. 2, 3 and 8). Through these connections the rock shaft 100 is rocked at proper intervals to bring the nose of the shuttle into and out of the plane of the needle.

The looper for laying the needle thread in the hook of the needle is formed on the lower end of a rod 108 which is mounted to slide in a tubular bearing 109 (Figs. 1, 2, 5 and 19). The needle thread passes through a thread eye 110 formed in the looper, and when it is operated on by the thread finger 3 the thread is laid across a recess 111 in the looper, as indicated in Fig. 19. As the needle is advanced into position to receive the thread, the looper is moved downward in front of the needle, and then is given a backward movement to carry the thread into the hook of the needle, as indicated in Fig. 19. The proper movements are imparted to the looper by the following devices: The bar 108 is reciprocated in the tubular bearing 109 through a link 112, one end of which is connected with the bar by a ball and socket joint, and the other end of which is connected to an arm 113 by a similar joint. The arm 113 is secured to a rock shaft 114 which is connected by a link 115 with an arm 116 secured to a rock shaft 117. A second arm 118 is secured to the rock shaft 117, and is connected by a link 119 to an arm 120 secured to the rock shaft 16. Through these connections the looper is given the proper vertical movements. The tubular bearing 109 is secured upon a rock shaft 121 which is held in normal position by a leaf spring 122 engaging an arm 123 secured to the end of the shaft (Fig. 14). A rearwardly projecting finger 124 is secured in the upper end of the tubular bearing 109, and is arranged to be engaged by a cam projection 125 carried by the block 26 heretofore referred to. At the proper time during the rotation of the shaft 9 the cam projection 125 strikes the finger 124 and rocks the tubular bearing to move the end of the looper bar rearwardly and thus carry the thread into the hook of the needle.

The thread finger 3 for drawing slack thread to be given up to one side of the needle loop as the needle draws the loop through the work, is secured in an arm 126 which is pivoted at 127 to a reciprocating slide 128 (Figs. 1, 4 and 5). The slide 128 is advanced and retracted through a lever 129 supported on a fixed pivot 130 and connected by a link 131 with the slide, and by a link 132 with an arm 133 which is secured to the rock shaft 114 heretofore described. Through these connections the slide is advanced and retracted at proper intervals to operate the thread finger. When the slide is advanced and retracted, the arm 126 is swung on its pivot to give the thread arm the proper motions by means of a link 134, one end of which is pivotally connected to the arm 126, and the other end of which is connected to a fixed pivot 135 on a bracket 136 in which the slide 128 is mounted.

The needle thread passes from the thread eye in the looper 2 over a guide truck 137 and thence about the takeup 5 by which the loop which has been drawn by the needle and passed around the shuttle is taken up and the needle thread drawn into the work to set the stitch. The takeup is so constructed and arranged that the thread is wrapped about its periphery without any substantial rendering of the thread, and a substantially uniform length of thread is maintained between the takeup and the work.

The takeup is also provided with means for automatically clamping the thread during its operation, so that a positive pull is applied to the thread to set the stitch. In the form shown the takeup comprises a wheel 138 having a grooved periphery about which the thread wraps during the operation of the takeup. The takeup wheel is secured upon a shaft 139, and the thread is guided to the takeup in line with the axis of the shaft, and preferably through the center of the shaft. From the center of the shaft the thread leads over a guide roll 140 mounted on the takeup wheel, and thence over a roll 141 mounted in a lever 142 which is pivoted at 143 on the takeup wheel. The lever 142 is provided with a clamp 144 arranged to engage the thread and clamp it against the periphery of the roll 140. The clamp 144 is held against the thread on the roll 140 by a light spring 145, so that a light tension is normally applied to the thread at this point. When the loop drawn by the needle and shuttle is to be taken up, and the stitch set, the takeup is rotated from the position indicated in Fig. 10 in the direction of the arrow. During the first part of the movement of the takeup the thread wraps around the roll 141, and then the tension on the thread passing over this roll operates the clamping lever 142 to force the clamp 144 firmly against the thread on the roll 140. The thread now wraps around the periphery of the takeup wheel, as indicated in Fig. 9, the force with which the thread is clamped and held increasing with any increase in the tension on the thread. When the takeup is rotated in the opposite direction the thread is delivered from the periphery of the takeup until the takeup approaches the position indicated in Fig. 10, when the pressure of the thread on the roll 141 is relieved, and thus the clamp 144 is automatically released to enable the thread for the next stitch to be drawn from the thread supply or thread measuring device as the loop of thread is carried about the shuttle.

The takeup is operated at the proper times during the operation of the machine by a cam 146 secured to the shaft 9, and provided with a cam groove engaged by a roll 147 which is carried by a link 148. The lower end of the link is guided upon the shaft 9, and the upper end is connected to one end of the lever 149, the other end of which is connected by a link 150 to an arm 151 on a sleeve 152. The sleeve 152 is mounted upon a stud 153, and is provided with a gear segment 154 engaging a pinion 155 secured to the end of the takeup shaft 139 (Figs. 1, 6 and 8).

The needle thread is led to the guide in the center of the takeup shaft 139 from a thread measuring device which, during the action of the takeup, draws from the thread supply the amount of thread requisite for forming a single stitch. This thread measuring device is illustrated in Figs. 6 and 7. As here shown, the needle thread leads from the thread supply over a guide roll 156, thence under a controlling finger 157, and thence over a guide roll 158, from which it leads to the guideway in the takeup shaft. The device for drawing off thread from the thread supply while the needle thread is clamped by the takeup comprises a roll 159 carried by a slide 160 and arranged to pass between the guide rolls 156 and 158. The slide 160 is connected by a link 161 with an arm 162 formed on the sleeve 152. The controlling finger 157 is formed on the upper end of a vertically movable rod 163, the lower end of which is connected to one end of a lever 164, the other end of which is connected by a link 165 with the lever 58 which carries the presser foot. The vertical position of the controller finger 157 will depend upon the thickness of the stock which is engaged by the presser foot, and the amount of thread drawn off during the downward movement of the roll 159 will depend upon the vertical position of the controller finger 157. The amount of thread drawn off by the measuring device will therefore vary with the thickness of the stock at the point of operation of the stitch forming devices, and by proper adjustment of the parts an amount of thread will be drawn off at each operation of the measuring device equal to that entering into the stitch being formed.

The mode of operation of the machine, and of the various devices for operating upon the thread and work, will be readily understood by those skilled in the art from the foregoing description of the construction and operation of the various mechanisms.

While it is preferred to employ the specific construction and arrangement of the parts shown and described, it will be understood that this construction and arrangement is not essential except so far as it is set forth in the claims, and may be varied and modified without departing from the invention.

Having explained the nature and object of the invention, and specifically described one form of machine in which it may be embodied, what I claim is:—

1. A lock stitch sewing machine, having, in combination, a curved hook needle, a looper, a takeup, a discoidal shuttle arranged with its axis substantially parallel with the axis of the needle movement, a shuttle carrier mounted to rock about an axis substantially at right angles to the axis of the shuttle, and mechanism for actuating the shuttle carrier to cause the nose of the shuttle to pass through the loop drawn by the needle and to remove the shuttle from the needle path, substantially as described.

2. A lock stitch sewing machine, having, in combination, a curved hook needle, a looper, a takeup, a discoidal shuttle arranged with its axis substantially parallel with the axis of the needle movement and having a nose offset from the plane of the body of the shuttle, a shuttle carrier mounted to rock about an axis substantially at right angles to the axis of the shuttle, and mechanism for actuating the shuttle carrier to cause the nose of the shuttle to pass through the loop drawn by the needle and to remove the shuttle from the needle path, substantially as described.

3. A lock stitch sewing machine, having, in combination, a needle, a looper, a takeup, a discoidal shuttle having a pointed nose rigid with the shuttle body, and a laterally movable loop spreading finger in the nose of the shuttle to spread the loop in the direction of the shuttle axis, substantially as described.

4. A lock stitch sewing machine, having, in combination, a needle, a looper, a takeup, a discoidal shuttle having a pointed nose provided with a groove in its side, a loop spreading finger normally held within the groove, and means for moving the spreader laterally out of the groove as the nose of the shuttle enters the loop drawn by the needle, substantially as described.

5. A lock stitch sewing machine, having, in combination, a curved hook needle, a looper, a takeup, a discoidal shuttle having a pointed nose rigid with the shuttle body, a loop spreading finger arranged within the nose of the shuttle and pivoted to swing laterally in spreading the loop in the direction of the shuttle axis, and means for operating the finger as the nose of the shuttle enters the loop drawn by the needle, substantially as described.

6. A lock stitch sewing machine, having, in combination, a curved hook needle, a looper, a shuttle, a takeup, a feed awl, a driving shaft provided with an inclined crank, and connections through which the shuttle, awl and looper are operated from the inclined crank, substantially as described.

7. A lock stitch sewing machine, having, in combination, a curved hook needle, a looper, a shuttle, a takeup, a feed awl, a driving shaft provided with an inclined crank, connections through which the shuttle, awl and looper are operated from the inclined crank, a second inclined crank on the driving shaft, and connections for operating the needle from said second crank, substantially as described.

8. A lock stitch sewing machine, having, in combination, a curved hook needle, a looper, a shuttle, a takeup, a thread arm, a feed awl, a driving shaft provided with an inclined crank, and connections through which the shuttle, awl, looper and thread arm are operated from the inclined crank, substantially as described.

In testimony whereof I have signed my name to this specification in the presence of two subscribing witnesses.

JENNIE SKINNER,
*Administratrix of the estate of Clarence F. Skinner, deceased.*

Witnesses:
JOHN ROSENBAUM,
JACOB MAX BRANDVEIN.